(12) United States Patent
Pan

(10) Patent No.: US 8,914,576 B2
(45) Date of Patent: Dec. 16, 2014

(54) BUFFER FOR RAID CONTROLLER WITH DISABLED POST WRITE CACHE

(75) Inventor: Weimin Pan, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 179 days.

(21) Appl. No.: 13/561,986

(22) Filed: Jul. 30, 2012

(65) Prior Publication Data

US 2014/0032836 A1 Jan. 30, 2014

(51) Int. Cl.
*G06F 12/08* (2006.01)

(52) U.S. Cl.
USPC ........... 711/113; 711/114; 711/143; 711/103; 711/E12.019

(58) Field of Classification Search
CPC ............... G06F 2212/283; G06F 2212/262; G06F 12/08; G06F 12/0866; G06F 12/0868; G06F 3/0689
See application file for complete search history.

(56) References Cited

U.S. PATENT DOCUMENTS

| | | | |
|---|---|---|---|
| 5,537,572 A | 7/1996 | Michelsen et al. | |
| 5,890,213 A * | 3/1999 | Sokolov | 711/113 |
| 7,370,148 B2 | 5/2008 | Ikeuchi et al. | |
| 7,411,757 B2 * | 8/2008 | Chu et al. | 711/E12.019 |
| 2002/0186789 A1 * | 12/2002 | Preishuber-Pfluegl | 375/316 |
| 2006/0277422 A1 * | 12/2006 | Berke et al. | 713/300 |
| 2007/0283086 A1 * | 12/2007 | Bates | 711/113 |
| 2009/0204758 A1 * | 8/2009 | Luning | 711/114 |
| 2011/0167203 A1 | 7/2011 | Yoshida et al. | |
| 2012/0300328 A1 * | 11/2012 | Coker et al. | 360/31 |

FOREIGN PATENT DOCUMENTS

| | | |
|---|---|---|
| KR | 20030051996 | 6/2003 |
| KR | 20070060301 | 6/2007 |

OTHER PUBLICATIONS

Kim, et al. "Striping and Buffer Caching for Software RAID File Systems inWorkstation Clusters", Proceedings 19th IEEE International Conference on Distributed Computing Systems 1999 8 pages.

* cited by examiner

*Primary Examiner* — Michael Krofcheck

(57) ABSTRACT

Enhancing management of controllers in a RAID system when a post-write-cache of a is disabled, by supplying a stripe buffer that stores sequential write requests—and before such requests are actually written in to the physical disc drives. The stripe buffer can temporarily store data, until the data level reaches the stripe buffer size. Thereafter, contents of the stripe buffer can be flushed onto disc.

20 Claims, 8 Drawing Sheets

BUFFER FOR RAID CONTROLLER WITH DISABLED POST WRITE CACHE

BACKGROUND

Various storage device configurations and geometries are commonly applied to meet the demands for higher storage capacity while maintaining or enhancing reliability of the mass storage subsystems. For example, one category of disk arrays is referred to as Redundant Array of Inexpensive/Independent Drives (RAID). Within a RAID system, varying levels of data storage redundancy can be employed to enable reconstruction of stored data in the event of data corruption or disk failure. These various types of redundant storage strategies is represented by the RAID system.

DETAILED DESCRIPTION

Figure 1:
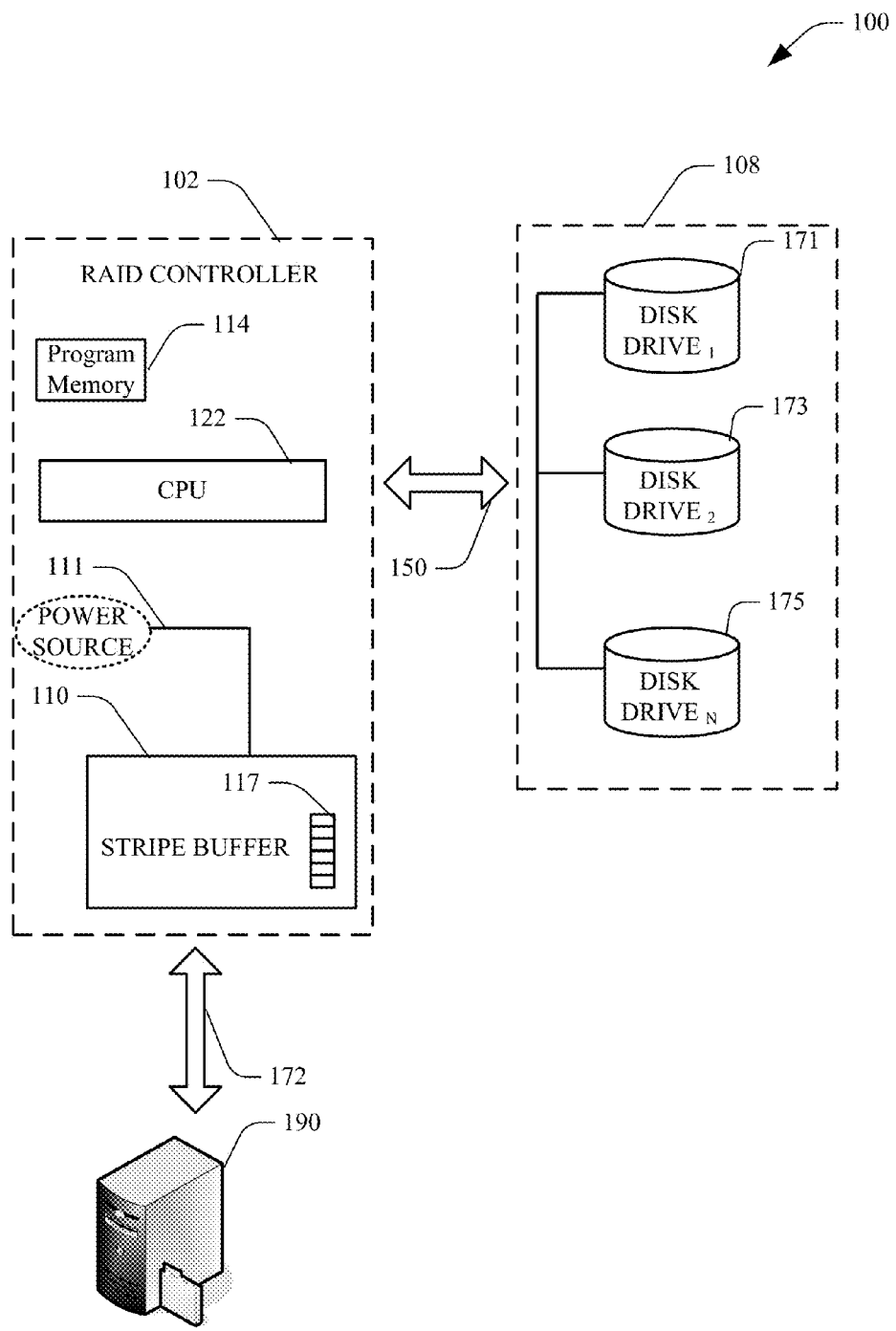
FIG. 1 illustrates an example of a RAID system that improves write performance when the post-write cache is disabled, according to an implementation of the subject disclosure.

With the advent of high performance and low latency of solid-state drives (SSD) in RAID storage systems, the performance bottleneck may shift from operation at the back-end drives, to processing capabilities of the controller CPU itself. For example, when employing SSDs and in case of high thread workload levels, having the post write cache in the RAID controller can substantially increase associated CPU cycles, hence burdening the controller CPU and degrading overall operations.

To overcome such bottlenecks and improve efficiency—some users may select to disable the controller cache in order to reach the maximum Input/Output Operations Per Second (IOPS) throughput. Nonetheless such disabling of the post write cache, itself can cause additional problems in parity blocks, such as the RAID 5 & RAID 6 distributed parity set up.

For example, the RAID 5 parity handling employs block-level striping with parity data distributed across all member disks, and RAID 6 extends RAID 5 by adding an additional parity block; thus employing block-level striping with two parity blocks distributed across all member disks. For such parity storing arrangements, when a host engages in sequential processes, employing full-stripe operations can significantly reduce number of read/write tasks (e.g., in order of magnitudes depending on the operation). It is noted that such benefits can occur in parity volumes regardless of the actual type of physical disk (e.g., SSD or not)—wherein full stripe is considered the optimized operation, which can significantly improve processes in parity blocks, as compared to non-full stripe writes. Similarly, for the case of sequential writes, combining all writes to create full stripes can substantially improve efficiency.

Indeed, when a post write cache is not disabled, sequential operations/continuous data may in fact be already combined. However, disabling the post write cache may potentially introduce inefficiencies that are not intended.

Various aspects of the subject disclosure improve sequential write performance for a RAID controller—when an associated controller post write cache is disabled—by supplying a buffer(s) that buffers sequential write requests in a flash or battery-backed buffer. Accordingly, before the sequential write requests are actually written in to the physical disc, such buffer—(hereafter referred to as a "stripe buffer")—can store sequential write requests until data level reaches its storage capacity. Subsequently, and upon reaching storage capacity of the stripe buffer, content of the stripe buffer can be flushed as a whole stripe on to the disc (hence the term "stripe buffer".) Hence for a sequential write request, flushing of content from the stripe buffer to the disc drives occurs upon storage capacity of the stripe buffer becoming full (e.g., for sequential write requests, flushing of the stripe buffer is delayed, until its content reaches full capacity.)

In particular, when the controller post write cache is disabled, such buffering by the stripe buffer can have relatively low impact on performance related to other types of workload, because associated metadata can be deemed negligible (e.g., searching dirty and valid data is substantially rapid.) Yet, it can still achieve a full benefit of parity volume full stripe write.

FIG. 1 illustrates an example of a RAID storage system 100 that improves write performance when the post-write cache is disabled, according to an implementation of the subject disclosure. The RAID storage subsystem 100 can include RAID controller 102 which is in turn connected to disk array 108—via a bus 150, and also to a host computer 190 through bus 172. As such, the Disk array 108 can include a plurality of disk drives 171, 173, 175 (1 thru N, where N is an integer). It is noted that that interface bus 150 between the RAID controller 102 and the disk array 108 can be any of interface busses including SCSI, IDE, EIDE, IPI, Fiber Channel, SSA, PCI, and the like. Similarly, the interface bus 172 between RAID controller 102 and host unit 190 can be any of several industry interface busses including SCSI, Ethernet (LAN), Token Ring (LAN), and the like.

Figure 2:
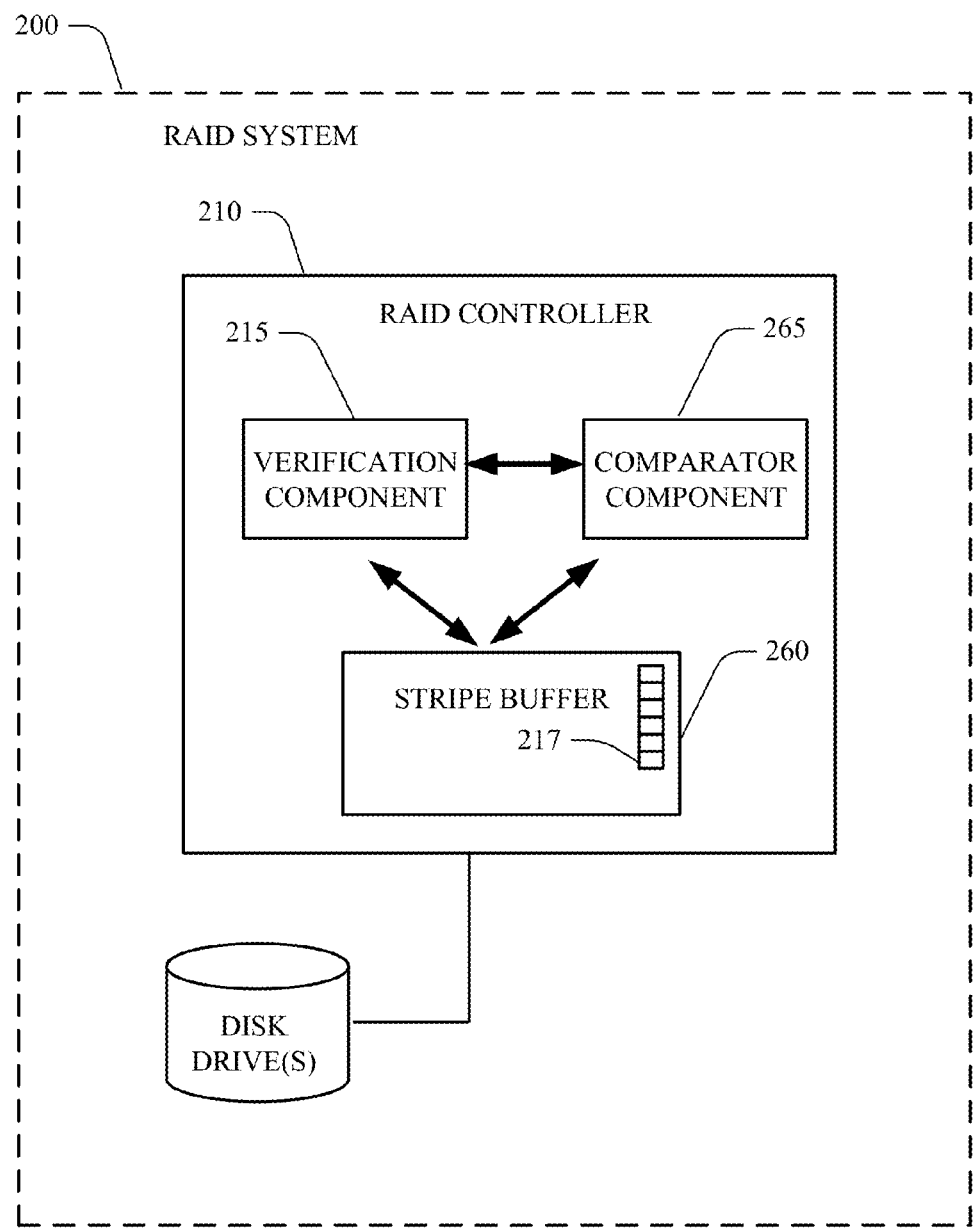
FIG. 2 illustrates an example of a RAID controller according to a further implementation of the subject disclosure.

Moreover, the host 190 can include personal computers, such as a laptop or desktop, a workstation, a server, or any device having a central processing unit (CPU) and requiring access to the disk array 108 for processing various of its requests (e.g., a plurality of client computers conveying read/write requests over the network to disk array 108 via the RAID controller 102. As illustrated in FIG. 2, the RAID controller 102 includes the CPU 122, program memory 114 (e.g. ROM/RAM devices for storing program instructions and variables for the operation of CPU 122), and memory for storing data and control information related to the data stored in disk array 108.

It is noted that the RAID storage system 100 can employ any of the well known RAID levels (e.g. levels 1-5). In this regard, the various RAID levels can be distinguished by the manner in which RAID controller 102 logically subdivides or partitions the disk drives 171, 173, 175 in the disk array 108. For example, when implementing RAID level 1 features, approximately half of the disk drives of disk array 108 can be employed to store and retrieve data while the other can be is operated by RAID controller 102 to mirror the data storage contents of the first half.

Likewise, when implementing RAID level 4 features, RAID controller 102 can employ a portion of the disk drives 171, 173, 175 in disk array 108 for the storage of data and the remaining disk drives can be employed for the storage of error checking/correcting information (e.g. parity information).

According to an implementation of the subject disclosure, during a post write cache disable case, the RAID controller 102 employs the stripe buffer 110 that manages a sequential write data being combined therein, to become a full stripe size 117 before writing to the disc array 108. Accordingly, data can be temporarily placed in the stripe buffer 110, wherein if received data remains sequential, the combining continues until a full stripe 117 is reached. Furthermore, the stripe buffer 110 can be connected to a power source 111 (e.g., battery backed), and can be allocated on per volume base of memory, wherein one stripe buffer 110 can be assigned to each volume, for example.

In this regard, when the controller post write cache is disabled for the RAID controller 102, the stripe buffer 110 can buffer sequential write requests in a flash or memory that is backed by power source 111, until data level reaches the buffer-size, and subsequently it writes the whole 117 stripe on to the disk array 108.

Furthermore, a size of the stripe buffer can be equal to the maximum stripe size that the control supports for each volume of the disk array 108. For example, if a control can support a maximum of 64 volumes, a predetermined memory representing 64 stripe buffers can then be allocated—wherein each stripe buffer is equal to the maximum size for a volume.

FIG. 2 illustrates a RAID system 200 with a RAID controller 210 having a stripe buffer in accordance with an implementation of the subject disclosure. The RAID system 200 can include a verification component 215, which determines whether the stripe buffer 260 has reached full capacity or not. The verification component 215 can initiate the flushing of content from the stripe buffer 260, as explained in detail below with respect to FIG. 3. Accordingly, contents of the stripe buffer 260 can be flushed into the disk, to free-up available space for a next round of the sequential write requests.

In this regard, the verification component 215 can further be communicatively coupled to a comparator component 265, which can compare (e.g., in real-time) the size of data placed in the buffer 260, with that of a full stripe size 217—and dynamically update the verification component 215 regarding status of available space in the stripe buffer. Hence, the sequential write requests that are actually written into the buffer are monitored, and if a full stripe size 217 buffer is not reached, data associated with a sequential write request continues to be placed in the stripe buffer 260, as described in further detail below.

Figure 3:
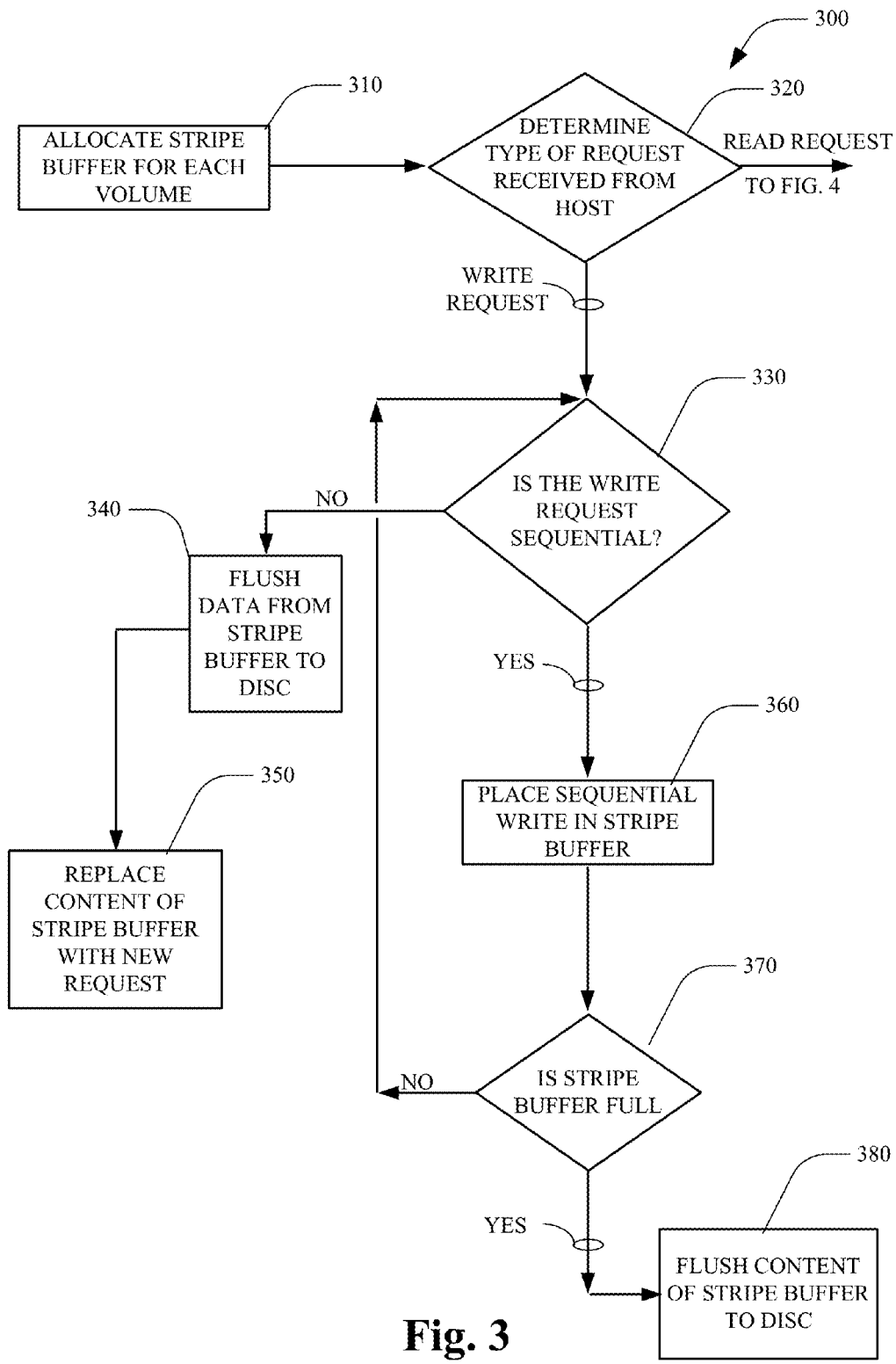
FIG. 3 illustrates a methodology of processing a host request, by a RAID controller that employs a stripe buffer according to an implementation of the subject disclosure.

FIG. 3 illustrates a related methodology 300 of processing host request, by a RAID controller with a stripe buffer according to an implementation of the subject disclosure. While this exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the techniques of the present application. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described.

Initially and at 310, a stripe buffer can be allocated for each storage space, wherein a storage space of a RAID group can be represented as a logical volume (each logical volume can be mapped to a volume identifier that is associated with a respective stripe buffer). When an associated controller post write cache is disabled for the RAID controller, the assigned stripe buffer for each logical volume can improve processes associated with a sequential write data. In this regard, the size of the stripe buffer for each logical volume of the physical disc can be deemed equal to the maximum stripe size, which the control supports. Subsequently and at 320, a determination is made regarding type of new request that is received from the host, and related to activities for accessing the disk array. For example, different types of requests corresponding to accessing a storage sector can be received, wherein at a preliminary stage the requests can initially be categorized as either a read request or a write request.

If it is determined that the new request is a write request at 320, the methodology 300 proceeds to block 330. At 330, a determination is made whether such write request is sequential (e.g., writing along a predetermined sequential path), or alternatively whether such write request is random (e.g., requires scattered block). If the write is not sequential, content of the stripe buffer can be flushed to the disc at 340. Such occurs even though the stripe buffer may have not reached its full capacity of a full stripe. The methodology then proceeds to block 350, wherein content of the stripe buffer can be replaced with the new write request that was earlier deemed not to be sequential.

Alternatively, and if at 330 a determination is made that the write request is sequential, such sequential write can be placed in the stripe buffer at 360, and the methodology proceed to block 370. At 370 a determination is performed as to whether the buffer is full, and if not the methodology reverts to block 330 wherein another incoming request can be evaluated. Alternatively, and if at 370 a determination is made that the buffer has indeed become full, the methodology proceed to act 380 wherein content of the buffer stripe is flushed to disc.

Figure 4:
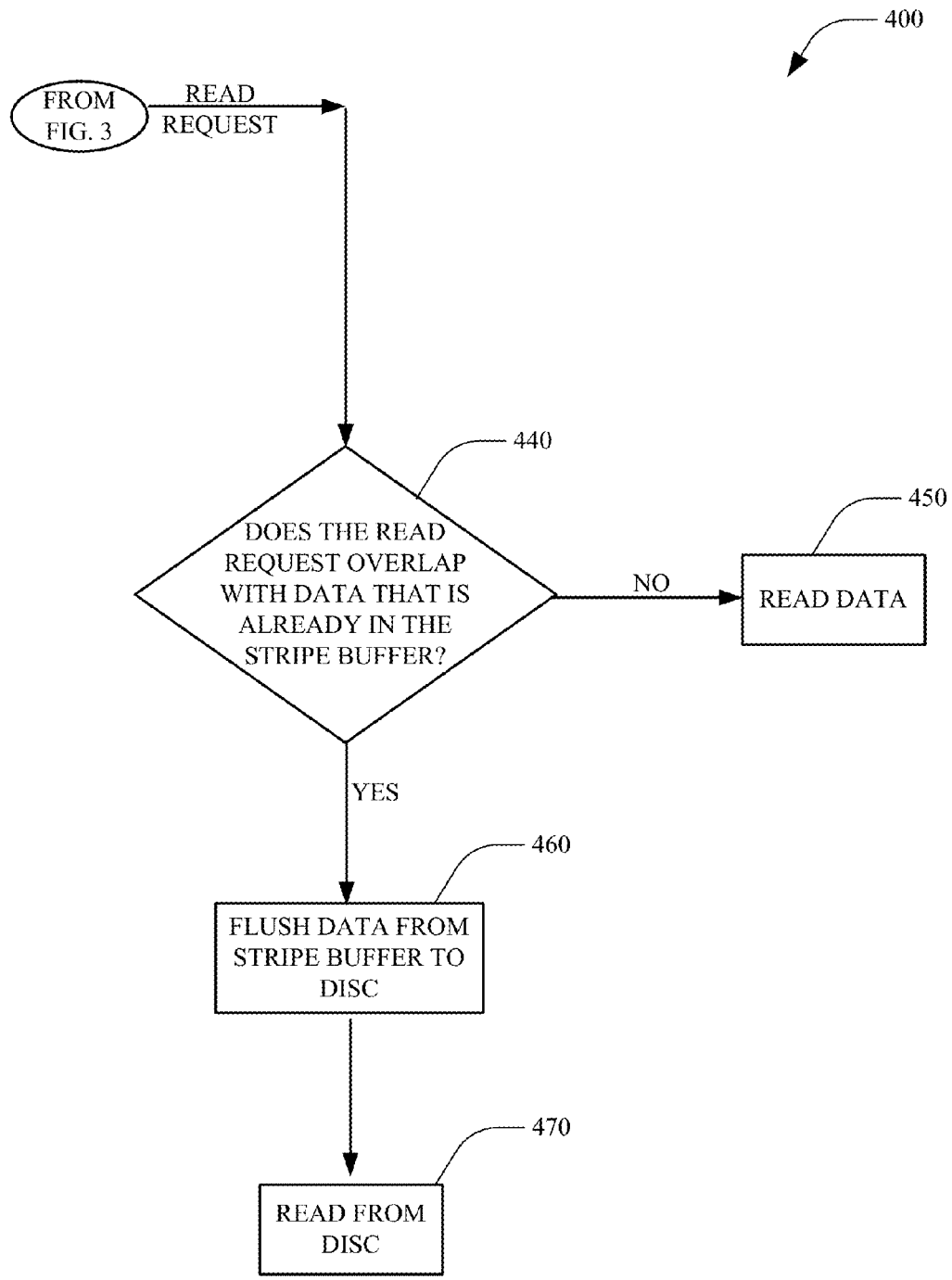
FIG. 4 illustrates a related methodology of processing a read request by a stripe buffer in accordance with an implementation of the subject disclosure.

FIG. 4 illustrate a methodology 400 related to identifying a read request in response to determining that type of request received from host is in fact a read request (block 320 of FIG. 3). As such, the methodology 400 proceeds to block 440, wherein a determination is performed to verify whether such read request overlaps with data that is already in the stripe buffer. If not, the methodology 400 proceeds to block 450, wherein the request can be processed and hence data read from the disk.

Alternatively and if at 440 a determination is made that the request overlaps with data that is already in the stripe buffer, the methodology proceeds to block 460. At 460, content of the stripe buffer can be flushed to the disc (even though the stripe buffer may have not reached its full capacity of a stripe buffer size). Subsequently, the request can be processed and data read from the disc at 470.

Figure 5:
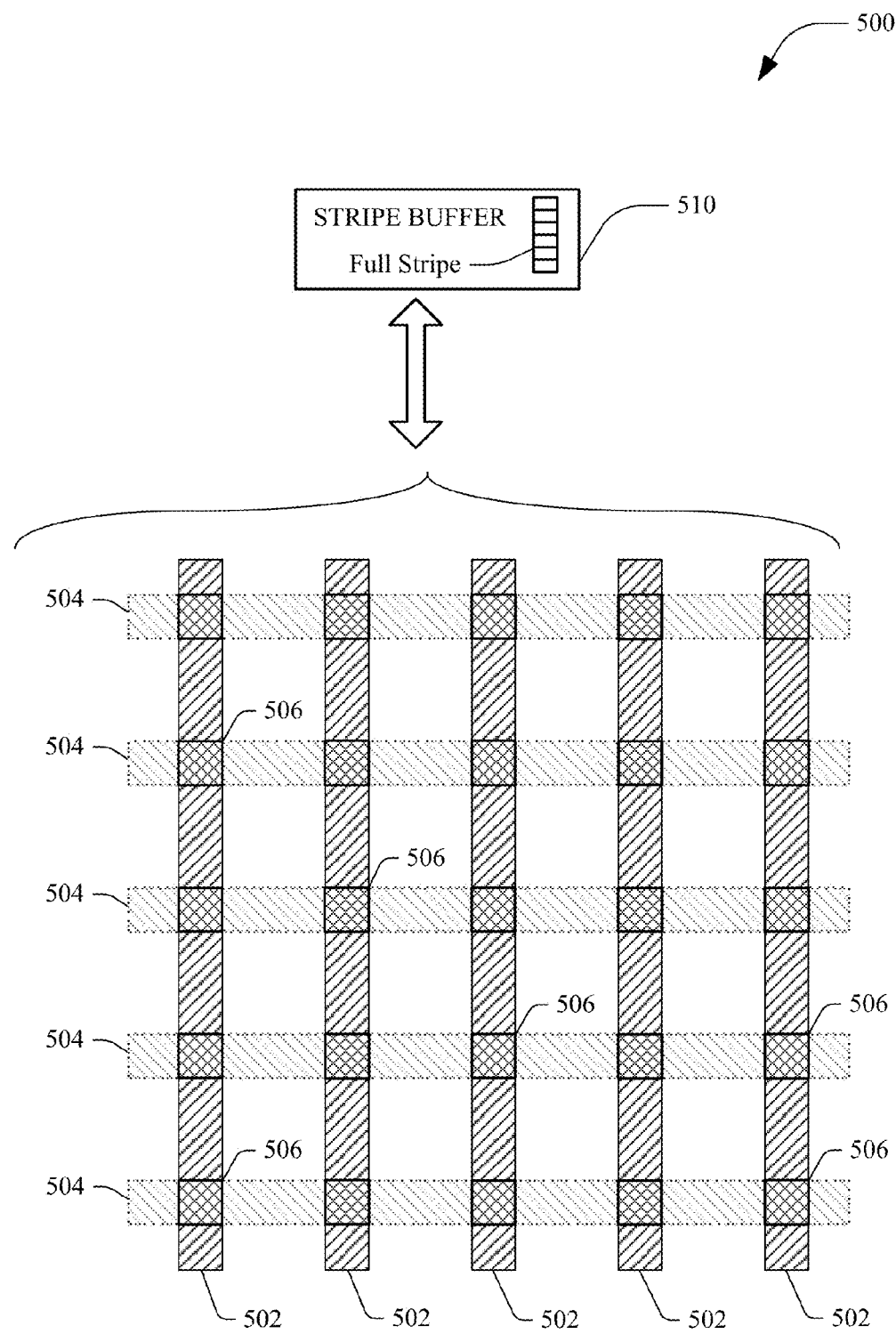
FIG. 5 illustrates a schematic illustration of a memory array interconnect that can implement various aspects of the stripe buffer, in accordance with an aspect of the subject disclosure.

FIG. 5 illustrates a schematic illustration of stripe buffer 510 that can communicate with a sector of the physical disk in from of a memory array interconnect 500, in accordance with the subject disclosure. As illustrated, a plurality of first interconnects 504 is orthogonally intersected by a plurality of second interconnects 502, creating intersections 506. Such intersections 506 can define the approximate boundaries of memory cells, for example.

The system 500 can represent a representation for wiring each row/column together, and to allow each individual bit position to be read. In this regard, the circuits connecting each row can be referred to as "word lines," while the ones for each column can be referred to as "bit lines." Read operations can simply include applying a voltage to each word line, and the bit lines will then show a voltage (or not) depending on whether each cell stores a 0 or a 1.

For example, in the grid of cells, the word lines can be connected to the transistors' gates. And the bit lines can be attached to their drains. One can read the contents of the cell can be by applying a low voltage to the gates, and determining if a current flows. As such, the word line to which that cell is connected can be energized to a voltage level below $V_{read}$.

In this regard, current can flow through the cell from the source line to its connected bit line if and only if the cell's float gate contains no charge (a 1). If the float gate contains a charge (a 0), the voltage threshold of the whole cell is deemed too high for the small voltage to overcome. The bit line connected to that cell is then checked for current. If it has a current, it can be treated as a logical 1; and alternatively if such is not the case a reading of logical 0 can be interpreted.

Moreover, the stripe buffer can be associated with a flash memory grid that includes 32 to 256 columns (and hence 32 to 256 bit lines) and 4,096 to 65,536 rows (and hence 4,096 to 65,536 word lines). The total grid can be referred to as a block, and each row referred as a page—wherein for the SSD, a read/write may occur in in pages, yet erase can occur only in blocks, for example.

As explained earlier, the stripe buffer 510 can be connected to a power source (e.g., battery backed), and can be allocated per volume base of memory, and hence assigned to each volume. In this regard, a size of the buffer can be equal to the maximum stripe size that the control can support for each memory volume of the disk array.

Figure 6:
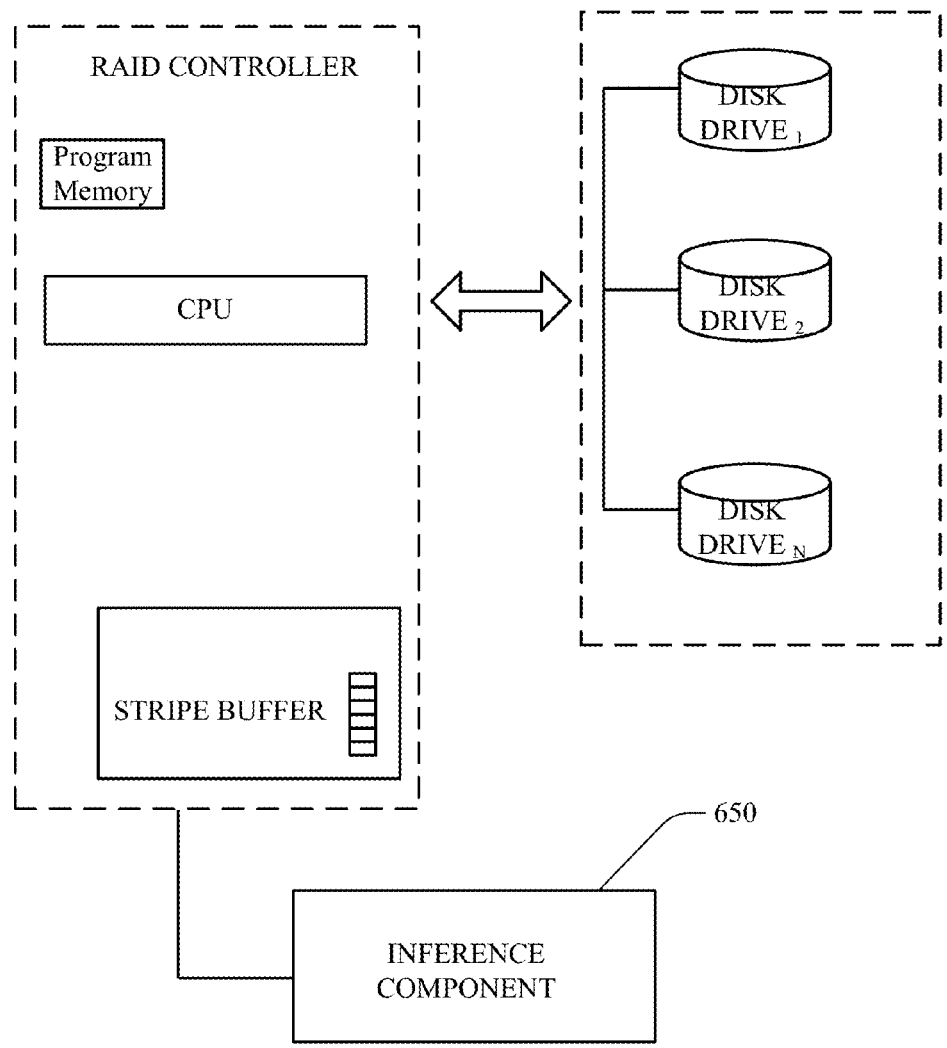
FIG. 6 illustrates an inference component that can interact with a stripe buffer according to further implementation of the subject disclosure.

FIG. 6 illustrates an inference component 650 (e.g., an artificial intelligence) that can interact with the stripe buffer 615, to facilitate inferring and/or determining when, where, how to process requests and evaluate their sequential or random characteristics according to an aspect of the subject disclosure.

As used herein, the term "inference" refers generally to the process of reasoning about or inferring states of the system, environment, and/or user from a set of observations as captured via events and/or data. Inference can identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The inference component 650 can employ any of a variety of suitable AI-based schemes as described supra in connection with facilitating various aspects of the herein described subject matter. For example, a process for learning explicitly or implicitly how parameters are to be created for training models based on similarity evaluations can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

The subject application can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, SVM's can be configured via a learning or training phase within a classifier constructor and feature selection module. A classifier is a function that maps an input attribute vector, x=(x1, x2, x3, x4, xn), to a confidence that the input belongs to a class—that is, f(x)=confidence(class).

Exemplary Networked and Distributed Environments

Figure 7:
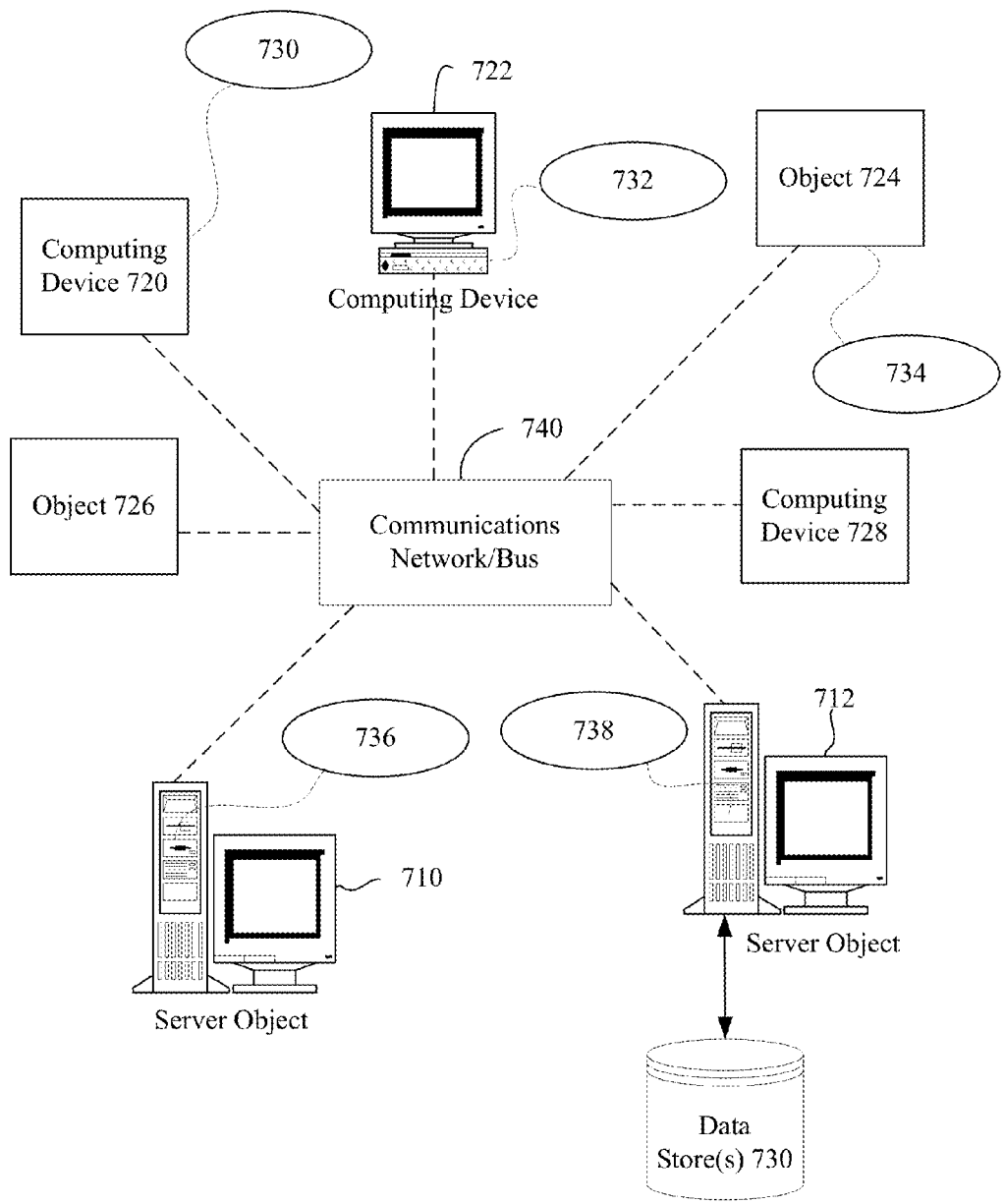
FIG. 7 provides a schematic diagram of an exemplary networked or distributed computing environment, wherein examples described herein can be implemented.

FIG. 7 provides a schematic diagram of an exemplary networked or distributed computing environment in which examples described herein can be implemented. The distributed computing environment includes computing objects 710, 712, etc. and computing objects or devices 720, 722, 724, 726, 928, etc., which can include programs, methods, data stores, programmable logic, etc., as represented by applications 730, 732, 734, 736, 738. It is to be appreciated that computing objects 710, 712, etc. and computing objects or devices 720, 722, 724, 726, 728, etc. can include different devices, such as personal digital assistants (PDAs), audio/video devices, mobile phones, MPEG-1 Audio Layer 3 (MP3) players, personal computers, laptops, tablets, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, communications network 740 can include other computing objects and computing devices that provide services to the system of FIG. 7, and/or can represent multiple interconnected networks, which are not shown. Each computing object 710, 712, etc. or computing objects or devices 720, 722, 724, 726, 728, etc. can also contain an application, such as applications 730, 732, 734, 736, 738, that might make use of an application programming interface (API), or other object, software, firmware and/or hardware, suitable for communication with or implementation of the various examples of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various examples.

Thus, a host of network topologies and network infrastructures, such as client/server, peer-to-peer, or hybrid architectures, can be utilized. The client can be a member of a class or group that uses the services of another class or group. A client can be a computer process, e.g., roughly a set of instructions or tasks, that requests a service provided by another program or process. A client can utilize the requested service without having to know all working details about the other program or the service itself.

As used in this application, the terms "component," "module," "system," and the like are intended to refer to a computer-related entity, either hardware, software, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

In a client/server architecture, particularly a networked system, a client can be a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc. provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances. Any of these computing devices can process data, or request transaction services or tasks that can implicate the techniques for systems as described herein for one or more examples.

A server can be typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 740 can be the Internet, for example, the computing objects 710, 712, etc. can be Web servers, file servers, media servers, etc. with which the client computing objects or devices 720, 722, 724, 726, 728, etc. communicate via any of a number of known protocols, such as the hypertext transfer protocol (HTTP). Computing objects 710, 712, etc. can also serve as client computing objects or devices 720, 722, 724, 726, 728, etc., as can be characteristic of a distributed computing environment.

Exemplary Computing Device

Figure 8:
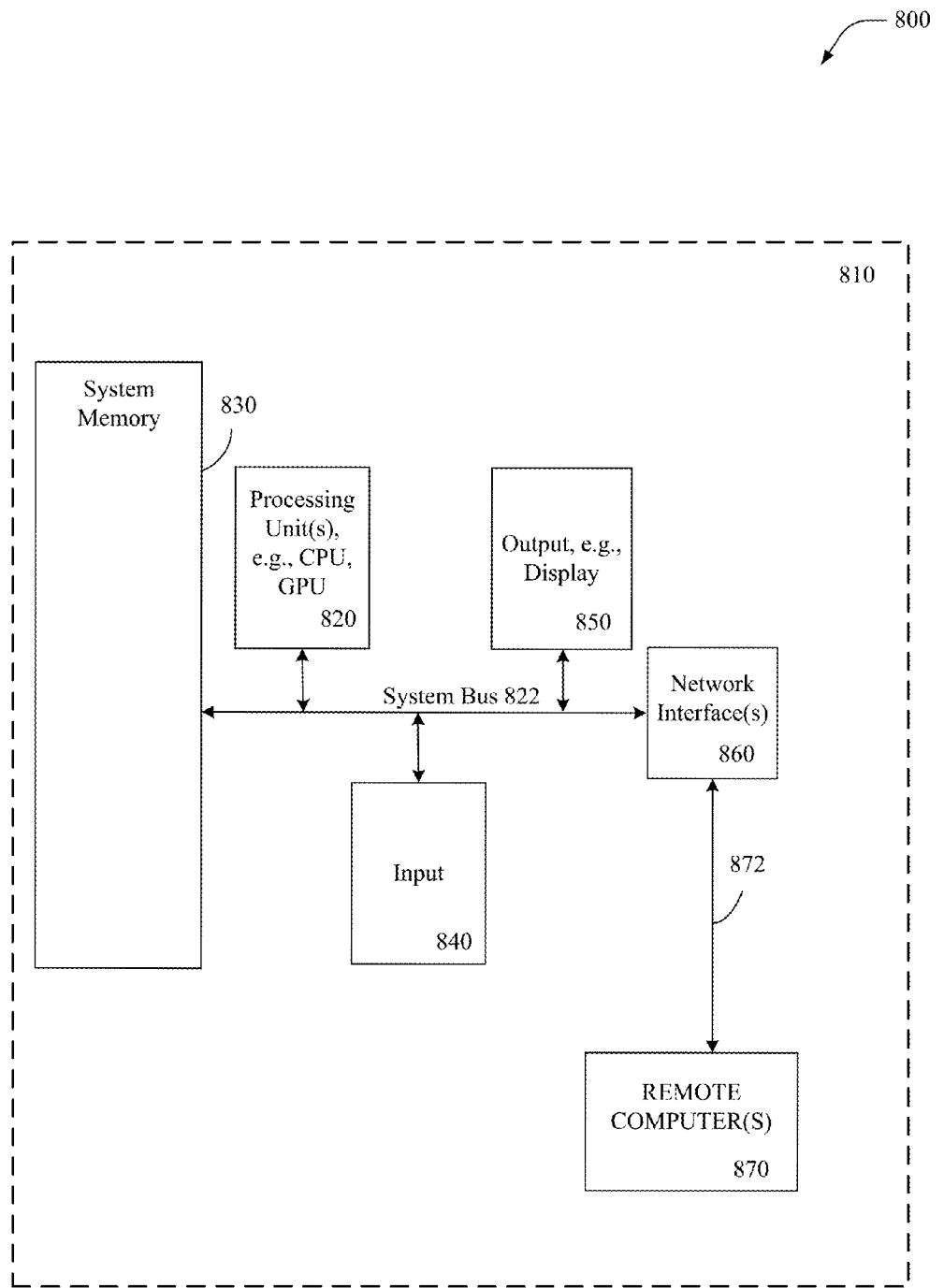
FIG. 8 illustrates an example for a computing device that can be implemented according to various aspects of the subject disclosure.

FIG. 8 illustrates an example for implementing various aspects of the subject disclosure. Components of computer 810 can include, but are not limited to, a processing unit 820, a memory 830, and a system bus 822 that couples various system components including the system memory to the processing unit 820. Computer 810 can be employed for example in connection with implementing the systems or components disclosed above.

Computer 810 typically includes a variety of computer readable media and can be any available media that can be accessed by computer 810. The memory 830 can include computer storage media in the form of volatile and/or non-volatile memory such as read only memory (ROM) and/or random access memory (RAM). By way of example, and not limitation, memory 830 can also include an operating system, application programs, other program modules, and program data.

A user can enter commands and information into the computer 810 through input devices 840, non-limiting examples of which can include a keyboard, keypad, a pointing device, a mouse, stylus, touchpad, touch screen, trackball, motion detector, camera, microphone, joystick, game pad, scanner, video camera or any other device that allows the user to interact with the computer 810. A monitor or other type of display device can be also connected to the system bus 822 via an interface, such as output interface 850. In addition to a monitor, computers can also include other peripheral output devices such as speakers and a printer, which can be connected through output interface 850.

The computer 810 can operate in a networked or distributed environment using logical connections to one or more other remote computers, such as remote computer 870. The remote computer 870 can be a personal computer, a server, a router, a network PC, a peer device or other common network node, or any other remote media consumption or transmission device, and can include any or all of the elements described above relative to the computer 810. The logical connections depicted in FIG. 8 include a network 872, such local area network (LAN) or a wide area network (WAN), but can also include other networks/buses e.g., cellular networks.

As mentioned above, while examples have been described in connection with various computing devices and network architectures, the underlying concepts can be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques detailed herein. Thus, examples herein are contemplated from the standpoint of an API (or other software object), as well as from a software or hardware object that implements one or more aspects described herein. Also, various examples described herein can have aspects that are wholly in hardware, partly in hardware and partly in software, as well as in software.

Computing devices typically include a variety of media, which can include computer-readable storage media and/or communications media, in which these two terms are used herein differently from one another as follows. Computer-readable storage media can be any available storage media that can be accessed by the computer, can be typically of a non-transitory nature, and can include both volatile and non-volatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, electrically erasable programmable read only memory (EEPROM), flash memory or other memory technology, compact disc read only memory (CD-ROM), digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal (e.g., a carrier wave or other transport mechanism) and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

It is to be understood that the examples described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessor and/or other electronic units designed to perform the functions described herein, or a combination thereof.

When the examples are implemented in software, firmware, middleware or microcode, program code or code segments, they can be stored in a machine-readable medium (or a computer-readable storage medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules or components (e.g., procedures, functions, and so on) that perform the functions described herein. The software codes can be stored in memory units and executed by processors. A memory unit can be implemented within the processor or external to the processor, in which case it can be communicatively coupled to the processor via various structures. In one example, the techniques of the present application can be employed using a memory that stores computer-executable or computer-readable instructions and a processor or computer communicatively coupled to the processor or computer that facilitates execution of the computer-executable or computer-readable instructions, or a computer readable medium (e.g., non-transitory) to perform functionality of the present application.

What has been described above includes examples of one or more examples. It is, of course, not possible to describe every conceivable combination of components or methodologies for purposes of describing the aforementioned examples, but one of ordinary skill in the art can recognize that many further combinations and permutations of various examples are possible. Accordingly, the described examples are intended to embrace all such alterations, modifications and variations that fall within the spirit and scope of the appended claims.

In addition to the various examples described herein, it is to be understood that other similar examples can be used or modifications and additions can be made to the described example(s) for performing the same or equivalent function of the corresponding example(s) without deviating there from. Still further, multiple processing chips or multiple devices can share the performance of one or more functions described herein, and similarly, storage can be affected across a plurality of devices.

What is claimed is:

1. A redundant array of inexpensive disks (RAID) storage system comprising:
   a RAID controller that is communicatively coupled to a disk array for a control of read and write operations, the RAID controller comprising:
   a write cache to store write requests; and
   a stripe buffer to store write requests of a host when the write cache is disabled for the RAID controller, wherein the RAID controller is to write the write requests stored in the stripe buffer to the disk array in response to reaching a full storage capacity of the stripe buffer.

2. The RAID storage system of claim 1, the RAID controller further comprising a power source to power the stripe buffer.

3. The RAID storage system of claim 1, wherein the RAID controller allocates the stripe buffer to a volume of storage space in the disk array.

4. The RAID storage system of claim 1 wherein the stripe buffer is to store only sequential write requests.

5. The RAID storage system of claim 1, the RAID controller further comprising a comparator component to compare an amount of data stored in the stripe buffer with a predetermined threshold.

6. The RAID storage system of claim 1, wherein the stripe buffer is a flash memory device.

7. The RAID storage system of claim 4, the RAID controller further comprising an inference component to identify the sequential write requests.

8. The RAID storage system of claim 1, wherein the RAID controller is to write the write requests stored in the stripe buffer as a whole stripe of a volume of the disk array.

9. The RAID storage system of claim 1, wherein the full storage capacity of the stripe buffer is equal to a size of a whole stripe of a volume of the disk array.

10. A method comprising:
    receiving, at redundant array of inexpensive disks (RAID) controller, a write request from a host;
    determining whether a write cache included in a RAID controller is disabled;
    in response to a determination that the write cache is not disabled, storing the write request in the write cache;
    in response to a determination that the write cache is disabled, storing the write request in a stripe buffer included in the RAID controller; and
    flushing content of the stripe buffer to a disk array volume upon the stripe buffer reaching full capacity.

11. The method of claim 10 further comprising verifying that the stripe buffer has reached full capacity.

12. The method of claim 10 wherein the disk array comprises a plurality of solid-state drives (SSDs).

13. The method of claim 10 wherein flushing the content of the stripe buffer comprises writing a plurality of stored write requests as a whole stripe of the disk array volume.

14. The method of claim 10 wherein the full capacity of the stripe buffer corresponds to a size of a whole stripe of a volume of the disk array.

15. A non-transitory machine-readable storage medium storing computer-executable instructions that upon execution cause a redundant array of inexpensive disks (RAID) controller to at least:

receive a write request from a host;

determine whether a write cache included in the RAID controller is disabled;

in response to a determination that the write cache is not disabled, store the write request in the write cache; and in response to a determination that the write cache is disabled, store the write request into a stripe buffer included in the RAID controller.

16. The non-transitory machine-readable storage medium of claim 15, wherein the computer-executable instructions further cause the RAID controller to determine whether the stripe buffer is full.

17. The non-transitory machine-readable storage medium of claim 16, wherein the computer-executable instructions further cause the RAID controller to write a plurality of write requests stored in the stripe buffer to a volume of a disk array in response to a determination that the stripe buffer is full.

18. The non-transitory machine-readable storage medium of claim 17, wherein the computer-executable instructions further cause the RAID controller to write the plurality of write requests as a whole stripe of a volume of the disk array.

19. The non-transitory machine-readable storage medium of claim 15, wherein the computer-executable instructions further cause the RAID controller to store the write request in the stripe buffer only if the write request is sequential with at least one write request previously stored in the stripe buffer.

20. The non-transitory machine-readable storage medium of claim 15, wherein the stripe buffer is sized to store an amount of data equal to a whole stripe of a volume of the disk array.

* * * * *